(12) United States Patent
Homi

(10) Patent No.: US 6,571,759 B2
(45) Date of Patent: Jun. 3, 2003

(54) RESIN INTAKE MANIFOLDS AND MANUFACTURING PROCESS THEREOF

(75) Inventor: Nobuyuki Homi, Higashihiroshima (JP)

(73) Assignee: G P Daikyo Corporation, Hiroshima (JP)

( * ) Notice: Subject to any disclaimer, the term of this patent is extended or adjusted under 35 U.S.C. 154(b) by 0 days.

(21) Appl. No.: 09/977,366

(22) Filed: Oct. 16, 2001

(65) Prior Publication Data

US 2002/0043234 A1 Apr. 18, 2002

(30) Foreign Application Priority Data

Oct. 16, 2000 (JP) .................................. 2000-315283

(51) Int. Cl.⁷ .............................................. F02M 35/104
(52) U.S. Cl. ................................ 123/184.47; 123/123.61
(58) Field of Search ........................ 123/184.34, 184.42, 123/184.61, 184.47, 184.24

(56) References Cited

U.S. PATENT DOCUMENTS

| | | | | |
|---|---|---|---|---|
| 4,515,115 A | * | 5/1985 | Okubo ................. | 123/184.42 |
| 4,867,110 A | * | 9/1989 | Distelrath ............. | 123/184.61 |
| 4,919,086 A | * | 4/1990 | Shillington ........... | 123/184.61 |
| 5,003,932 A | * | 4/1991 | Duncan ................ | 123/184.34 |
| 5,063,885 A | * | 11/1991 | Yoshioka ............. | 123/184.34 |
| 5,253,616 A | * | 10/1993 | Voss ................... | 123/184.47 |
| 5,273,010 A | * | 12/1993 | Elder .................. | 123/184.61 |
| 5,492,088 A | * | 2/1996 | Ohrnberger ........... | 123/184.34 |
| 5,657,727 A | * | 8/1997 | Uchida ................ | 123/184.47 |
| 5,870,988 A | * | 2/1999 | Fujimori et al. ...... | 123/184.61 |

FOREIGN PATENT DOCUMENTS

| | | | | |
|---|---|---|---|---|
| DE | 3741093 | * | 6/1989 | ........... 123/184.42 |
| GB | 2252791 | * | 8/1992 | ........... 123/184.47 |
| JP | 62-87315 | | 4/1987 | |
| JP | 04-91914 | | 3/1992 | |
| JP | 07-166875 | | 6/1995 | |
| JP | 10-196373 | | 7/1998 | |
| JP | 10-231760 | | 9/1998 | |
| JP | 10-299591 | | 11/1998 | |

* cited by examiner

Primary Examiner—Paul J. Hirsch
(74) Attorney, Agent, or Firm—Nixon & Vanderhye, P.C.; Frank P. Presta

(57) ABSTRACT

A resin intake manifold includes a chamber section having an intake port which leads to a throttle body 91, and a plurality of pipe sections 7 which connect interior of the chamber section to cylinders of a multi-cylinder internal combustion engine. The chamber section is made up of a plurality of port members 1 coupled together, each port member 1 including the pipe section 7 and a cylindrical section 6 whose external wall is connected to an end of the pipe section 7.

13 Claims, 12 Drawing Sheets

CROSS SECTION TAKEN ALONG A - A'

CROSS SECTION TAKEN ALONG B - A'

CROSS SECTION TAKEN ALONG D - D'

CROSS SECTION TAKEN ALONG E - D'

RESIN INTAKE MANIFOLDS AND MANUFACTURING PROCESS THEREOF

FIELD OF THE INVENTION

The present invention relates to a resin intake manifold for distributing intake air through a throttle body of a multi-cylinder internal combustion engine of an automobile, etc., or a gaseous mixture of air and fuel into different cylinders of the multi-cylinder internal combustion engine, and a manufacturing process of such a resin intake manifold.

BACKGROUND OF THE INVENTION

The conventional choice of intake manifold is an intake manifold made of resin (resin intake manifold), chiefly due to its superior properties providing good insulation, lightweight, and more freedom in terms of shape. The resin intake manifold includes a chamber section having an intake port which opens into a throttle body, and a plurality of pipe sections which connect interior of the chamber section to the respective cylinder of a multi-cylinder internal combustion engine. The configuration of the resin intake manifold is generally complex and its manufacturing process generally involves splitting the resin intake manifold into a plurality of half-parts and later joining them in a post-process. In this case, in order to reduce the number of divisions of the resin intake manifold, a slide mechanism which can form a plurality of pipe sections at once has been known.

① Japanese Unexamined Patent Publication No. 166875/1995 (Tokukaihei 7-166875) (published date: Jun. 27, 1995) and ② Japanese Unexamined Patent Publication No. 231760/1998 (Tokukaihei 10-231760) (published date: Sep. 2, 1998) disclose a resin intake manifold which has an opening, leading to a throttle body, at one end of the chamber, and a plurality of pipes which are lined and integrated with the chamber. Further, ③ Japanese Unexamined Patent Publication No. 196373/1998 (Tokukaihei 10-196373) (published date: Jul. 28, 1998) and ④ Japanese Unexamined Patent Publication No. 299591/1998 (Tokukaihei 10-299591) (published date: Nov. 10, 1998) disclose a resin intake manifold in which an opening leading to a throttle body is provided at a center of the chamber.

The resin intake manifolds of the foregoing publications ① through ④ all have complex configurations, which force them to employ a manufacturing method using the slide mechanism which can create complex shapes with a small number of divisions.

However, with conventional methods using the slide mechanism, the resin intake manifold is formed by design, for example, from two or three divided parts, and this requires a mold with a large manufacturing cost. Thus, when the number of intake manifolds manufactured is small, the manufacturing cost per product is increased. Further, manufacturing methods using the slide mechanism require the pipes to be provided inside the chamber, which necessitates the use of an additional member, a partition wall, which is provided separately from a mold. The partition wall has a complex fitting structure, and causes the problem of flat areas in the inner wall surface of the pipe sections.

That is, resin intake manifolds generally have complex configurations, and to reduce the number of divisions, the slide mechanism has been used conventionally. However, manufacturing methods using the slide mechanism have problems that 1) it requires a large and expensive mold and the manufacturing cost per product is increased when the number of products manufactured is small, 2) the partition wall used to provide the pipe sections has a complex fitting structure, and 3) flat areas are formed in the inner wall surface of the pipe sections.

SUMMARY OF THE INVENTION

The present invention was made in view of the foregoing problems, and its object is to provide a resin intake manifold which can be manufactured at low cost even when the number of products manufactured is small, and a manufacturing process of such a resin intake manifold.

In the present invention, as the term is used herein, "resin" refers to those molding materials which can flow into a mold when melted to become a molten material at a high temperature, and which become sufficiently strong when solidify. Accordingly, the resin used in the present invention is not just limited to so-called polymer resins such as plastic.

In order to achieve this object, a resin intake manifold of the present invention includes a chamber section with an intake port which leads to a throttle body, and a plurality of pipe sections which connect interior of the chamber section to respective cylinders of a multi-cylinder internal combustion engine, wherein: the chamber section comprises a cylinder body which is made up of a plurality of port members coupled together, each of the plurality of port members having a pipe section, and a cylindrical section whose external wall is connected to one end of the pipe section.

The chamber section of the resin intake manifold of the present invention comprises a cylinder body which is made up of a plurality of port members coupled together, each of the plurality of port members having a pipe section, and a cylindrical section whose external wall is connected to one end of the pipe section. That is, the resin intake manifold is divided into the port members which can be manufactured using a small mold of a low cost of production. As a result, less cost is required for the mold, which allows the resin intake manifold to be manufactured at low cost even when the number of products manufactured is small.

The port members may be provided, for example, as a cast of half-parts. That is, the port members can be provided without using the slide mechanism, and therefore do not require the use of the partition wall having a complex fitting structure. This prevents areas of flat portions in the inner wall of the pipe section.

Further, by changing the number of port members of the chamber section, the product resin intake manifold can adapt to engines with various numbers of cylinders, provided that the cylinders of the engine have substantially the same displacement. That is, the port member can be used as a common member to manufacture a resin intake manifold which can adapt to engines with various numbers of cylinders. Thus, manufacturing cost of resin intake manifolds can be reduced.

In the present invention, "chamber section" refers to a hollow portion of a section whose external wall is connected to one end of the pipe section, and, for example, it is formed by coupling the cylindrical body which is made up of the plurality of port members coupled together, a throttle body mounting pipe member, and a lid section which closes an end or both ends of the cylindrical body. Note that, the cylindrical body may alternatively comprise the plurality of port members coupled to a cylindrical member which is provided with an intake port and inserted between any of the port members. The shape of the chamber section, which is not particularly limited, is cylindrical, for example.

The resin intake manifold of the present invention may have an arrangement wherein the pipe section extends out of the chamber section to coil along the external wall of the chamber section, and at least a portion of the external wall of the pipe section on the side of the external wall of the chamber section is connected to the external wall of the chamber section.

With this arrangement, the air space of gap between the pipe section and the chamber section can be eliminated, thus making the resin intake manifold compact.

In addition, rigidity of the chamber section can be improved. Thus, for example, even when the chamber section is under high pressure due to a backfire, etc., the pressure can be dispersed over the pipe section through the connected portion, thus preventing damage to the chamber section.

The resin intake manifold of the present invention may have an arrangement wherein an opening portion of the pipe section on the side of the chamber section is in the form of a funnel.

With this arrangement, gas flows more smoothly from the chamber section to the pipe section, thus improving suction efficiency of the pipe section. According to this arrangement, the funnel is integrated as a portion of the pipe section when forming the port member. This makes the inner wall of the opening portion in the form of a funnel smoother than that of the funnel which is separately provided later to the opening end of the pipe section. As a result, gas flows more smoothly from the chamber section to the pipe section, thereby further improving suction efficiency of the pipe section.

The resin intake manifold of the present invention may have an arrangement wherein: the chamber section comprises a cylindrical body which is made up of the plurality of port members coupled to a cylindrical member which is provided with an intake port and inserted between any of the port members, and the pipe section is curved to coil along an external wall of the chamber section, and is bent toward the intake port.

With this arrangement, the resin intake manifold can be made more compact while ensuring sufficient length for the pipe section.

The resin intake manifold of the present invention is preferably manufactured by the steps of: forming the port member having the pipe section and the cylindrical section whose external wall is connected to one end of the pipe section; and forming the cylindrical body which is made up of the plurality of port members coupled together.

This method allows the port members to be manufactured using a small mold, thus manufacturing the resin intake manifold at low production cost even when the number of products manufactured is small.

For a fuller understanding of the nature and advantages of the invention, reference should be made to the ensuing detailed description taken in conjunction with the accompanying drawings.

BRIEF DESCRIPTION OF THE DRAWINGS

FIG. 4(*b*) is a cross sectional view taken along the line A-A'; and FIG. 4(*c*) is a cross sectional view taken along the line B-A'.

FIG. 6(*b*) is a cross sectional view taken along the line D-D'; and FIG. 6(*c*) is a cross sectional view taken along the line E-D'.

DESCRIPTION OF THE EMBODIMENTS

The following will describe embodiments of the present invention with reference to FIGS. 1 through 12.

First Embodiment

One embodiment of the present invention is described below with reference to FIG. 1 through FIG. 4. Note that, the present embodiment describes the case where a resin intake manifold of the present invention is applied to an in-line three-cylinder internal combustion engine.

Figure 1:
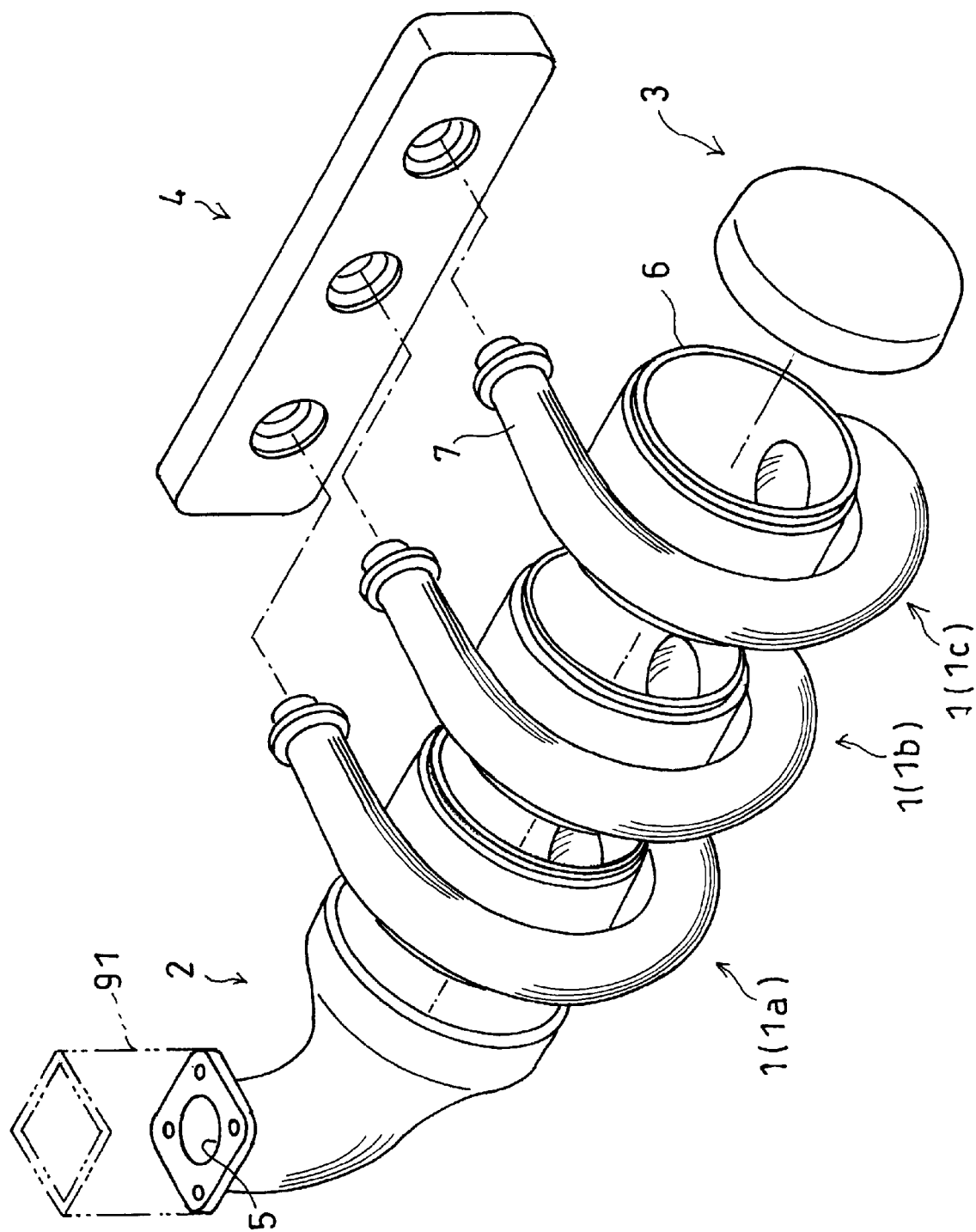
FIG. 1 is a perspective view showing a resin intake manifold of the First Embodiment in a divided state.
Figure 2:
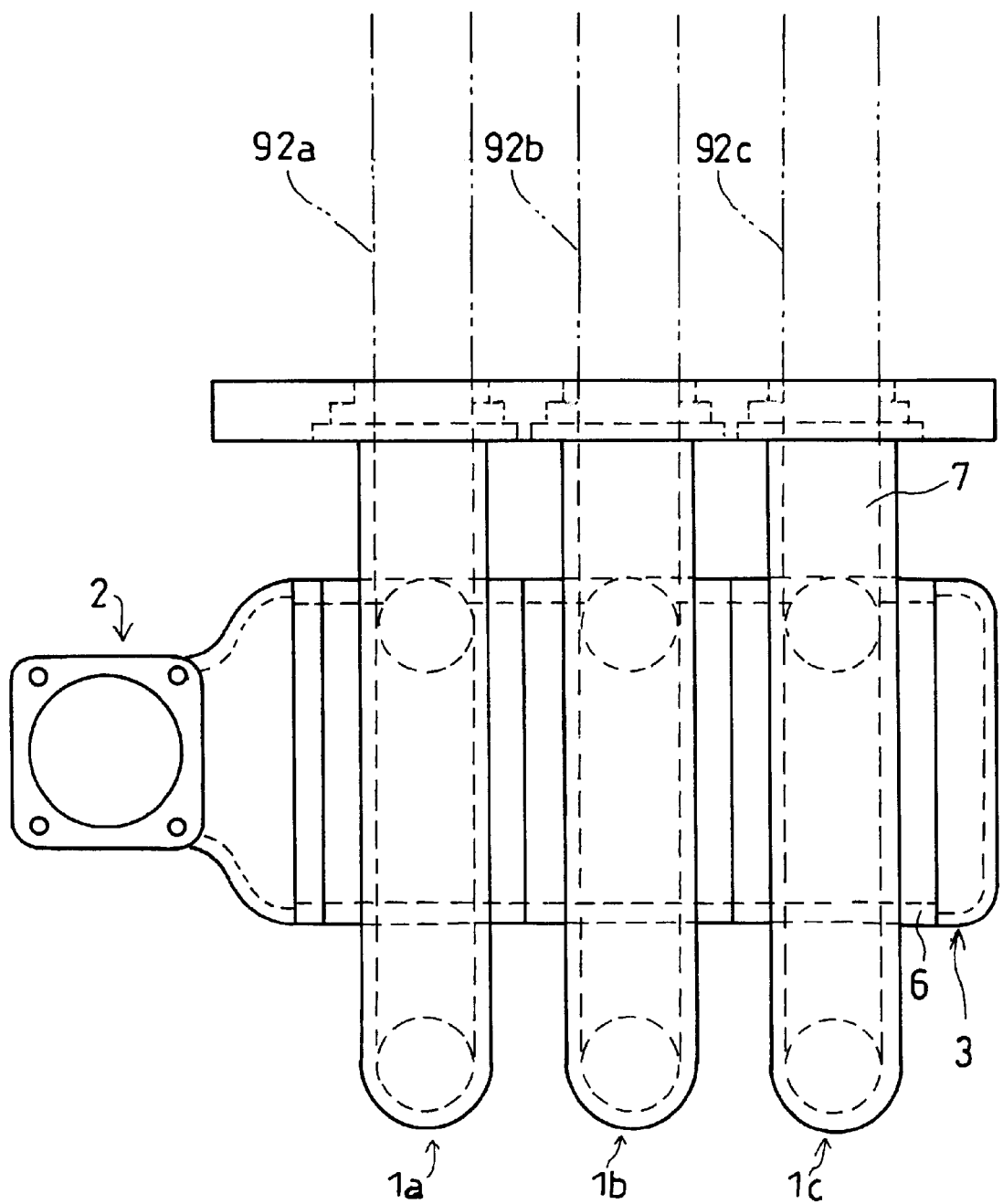
FIG. 2 is a plan view showing an internal structure of the resin intake manifold of the First Embodiment.

As shown in FIG. 1 and FIG. 2, the resin intake manifold of the present invention includes port members 1*a*, 1*b*, 1*c*, a throttle body mounting pipe member (cylindrical body, chamber section) 2, a lid member (chamber section) 3, and a cylinder head mounting board member 4.

The port members 1*a* through 1*c* of the resin intake manifold of the present invention all have the same configuration, and thus the port members 1*a* through 1*c* will be collectively referred to as a port member(s) 1 unless distinguished otherwise. One end of the throttle body mounting pipe member 2 makes up an intake port 5 which leads to a throttle body 91, and the other end makes up a joint face joined with a cylindrical section (cylindrical body, chamber section) 6 of the port member 1. The cylinder head mounting board member 4 serves to connect opening ends of pipe sections 7 of the port members 1 to cylinders 92*a*, 92*b*, 92*c* of the in-line three-cylinder internal combustion engine. Note that, the cylinders 92*a*, 92*b*, 92*c* will be collectively referred to as a cylinder 92 unless distinguished otherwise. The throttle body mounting pipe member 2 is joined with one end of the cylindrical body which is composed by joining cylindrical sections 6 of the port members 1 to one another, and the other end of the cylindrical body is joined with the lid member 3, so as to form the chamber section of the resin intake manifold.

Figure 3:
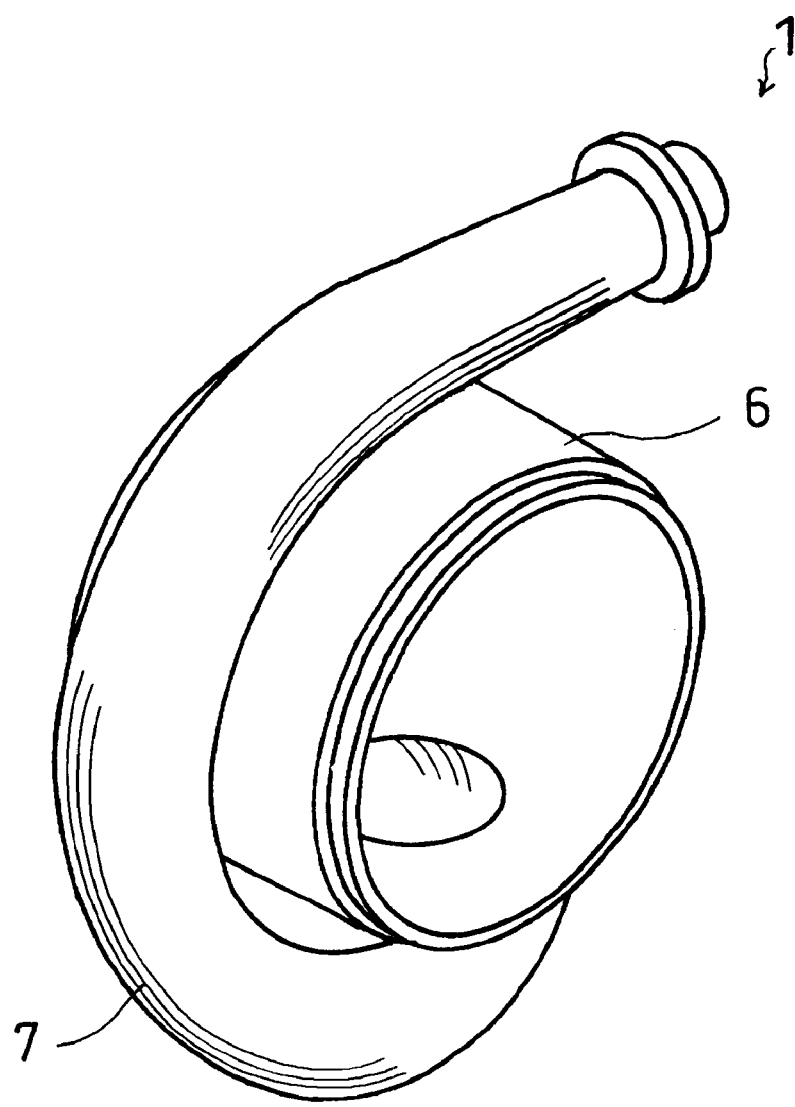
FIG. 3 is a perspective view showing a structure of a port member making up the resin intake manifold of the First Embodiment.
Figure 4:
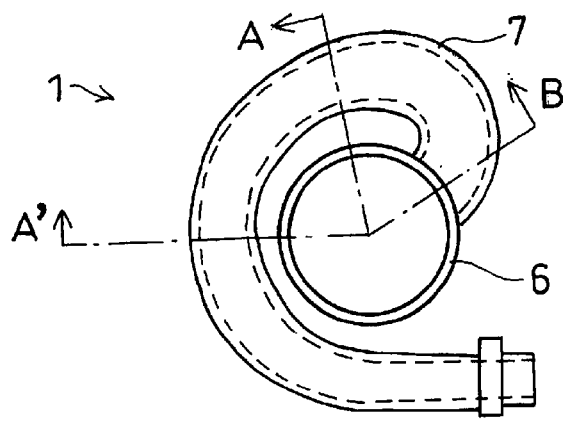
FIG. 4(*a*) through FIG. 4(*c*) show a structure of the port member making up the resin intake manifold of the First Embodiment, in which FIG. 4(*a*) is a side view.
Figure 4:
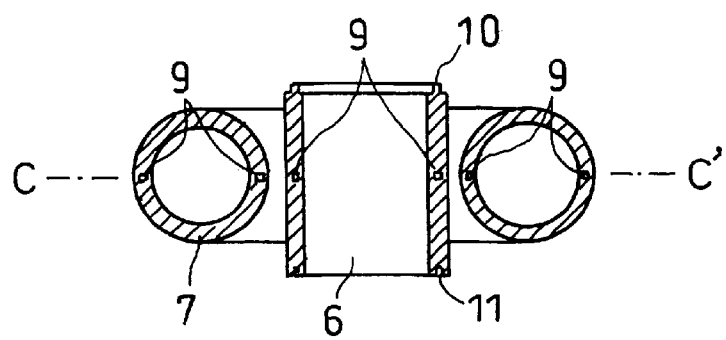
Figure 4:
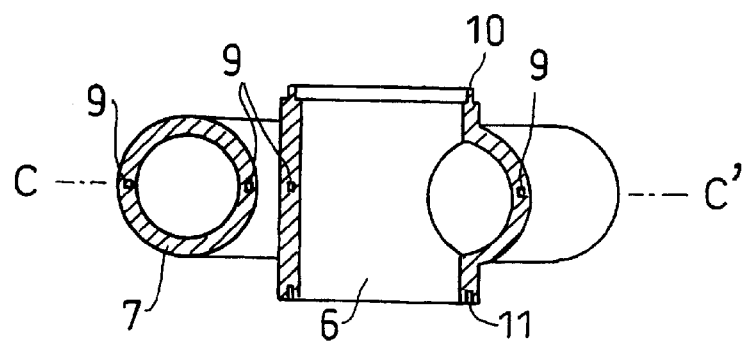

The port member 1 comprises, as shown in FIG. 3, a pipe section 7, and the cylindrical section 6 with its external wall integrated with one opening end of the pipe section 7. The pipe section 7 is curved along the external wall of the cylindrical section 6. The other opening end of the pipe section 7 leads to the cylinder 92 via the cylinder head mounting board member 4.

Between the external wall of the pipe section 7 and that of the cylindrical section 6, there exists a gap (air space), as shown in FIG. 4(a). The port member 1 is formed by joining divided half-parts of the port member 1 along the line C-C' as shown in FIG. 4(b) and FIG. 4(c). Methods of joining the half-parts are not particularly limited, and the present embodiment employs a method using molten resin.

In this method using molten resin, the joint face of each half-part is provided with a groove so that it combines with the other to form a molten resin groove when the half-parts are joined. The joint faces of the half-parts are then joined by flowing molten resin in the molten resin groove while the joint faces of the half-parts are mated. In the present embodiment, the port member 1 is formed by joining the divided half-parts along the line C-C' by flowing molten resin in the molten resin groove 9.

Specific examples of the method using molten resin include the DSI (Die Slide Injection) method, and a DRI (Die Rotary Injection) method.

The DSI method is disclosed in Japanese Unexamined Patent Publication No. 87315/1987 (Tokukaisho 62-87315) (published date: Apr. 21, 1987) [Japanese Examined Patent Publication No. 38377/1990 (Tokukouhei 2-38377) (published date: Aug. 30, 1990)]. Specifically, the method employs a pair of molds of male and female patterns for casting half-parts of a hollow cast, wherein the male and female patterns of one mold face the opposite patterns, namely, the female and male patterns, of the other mold. The half-parts are casted by injecting molten resin into a pair of cavities between opposing male and female patterns. Then, one of the mold is slid so that the half-parts remaining in the female patterns of the respective molds are mated with each other. The pairs of half-parts so mated are then joined each other by injecting molten resin around the periphery of the mating faces. The end product of these procedures is the hollow cast.

The DRI method, which is a process for manufacturing a hollow body, is disclosed in Japanese Unexamined Patent Publication No. 91914/1992 (Tokukaihei 4-91914) (published date: Mar. 25, 1992) [Japanese Examined Patent Publication No. 4830/1995 (Tokukouhei 7-4830) (published date: Jan. 25, 1995)]. Specifically, it is the method of manufacturing a hollow body by the steps of molding one half of a hollow body; molding the other half of the hollow body; and mating the two half-parts. This method employs a pair of molds combined to open or close with respect to each other, one capable of rotating with respect to the other, and each having at least one male and two female patterns on its molding surface. In the first step of injection molding (first molding step), the first half-part is molded in a male-female cavity, the second half-part is molded in a female-male cavity, and a whole part is molded in a female—female cavity by mating the first half-part and the second half-part which were molded in the previous sequence. The molds are then separated from each other (mold releasing step). In the next step (forward or reverse rotation step), one of the molds is rotated relative to the other by a predetermined angle in a forward direction or reverse direction, so as to mate the male pattern of one of the molds with either female pattern of the other mold, and the female patterns of the two molds with each other. In the next step (second molding step), the sequence of the first molding step is repeated so that the first half-part is molded in a male-female cavity, the second half-part is molded in a female-male cavity, and a whole part is molded in a female—female cavity by mating the first half-part and the second half-part which were molded in the first molding step. The hollow body is manufactured by repeating these sequences.

Another example of the methods of joining the half-parts, other than the method using molten resin, is a vibration fusing method by which the mating faces are joined by fusion by the heat of friction. Note that, when the vibration fusing method is adopted to join the half-parts, no grooves will be required on the mating faces of the half-parts to provide the molten resin groove 9.

Further, the mating faces of the cylindrical section 6 of the port member 1 has a raised portion 10 on one end and a recessed portion 11 on the other end in the form of a continuous ring along a central portion of these faces. The raised portion 10 and the recessed portion 11 are fitted to each other when the port members 1 are joined at the mating faces.

The method of joining the port member 1, the throttle body mounting pipe member 2, the lid member 3, and the cylinder head mounting board member 4 is not particularly limited. Some of the Examples are: the vibration fusing method, a laser fusing method, a fastening method using an adhesive agent, a fastening method using a bolt, and a fastening method using a nail.

As described, the chamber section of the resin intake manifold of the present invention is made up of the cylindrical body which is composed of a plurality of port members 1, each of which includes the pipe section 7 and the cylindrical section 6 whose external wall is integrated with one end of the pipe section 7. That is, the resin intake manifold of the present invention can be divided into port members 1, and therefore can be manufactured with the use of smaller molds than those used in the manufacturing method employing the slide mechanism. As a result, less cost needs to be spent on the molds, and the resin intake manifold can be manufactured at low cost even when the number of products manufactured is small.

Further, because manufacture of the resin intake manifold does not employ the slide mechanism, there will be required no partition wall of the complex fitting structure, thus forming the pipe section 7 with superior suction efficiency with a substantially circular cross sectional area with no flat portions.

Further, resin intake manifolds with different numbers of pipe sections 7 can be obtained by changing the number of port members 1 to be joined. That is, provided that the cylinders of the engine have substantially the same displacement, the product resin intake manifold can adapt to engines with various numbers of cylinders. That is, the port member 1 can be used as a common member to manufacture resin intake manifold which can adapt to engines with various numbers of cylinders. Therefore, manufacture of the resin intake manifold requires less cost.

The present embodiment described the resin intake manifold which joins three port members 1 to adapt to an in-line three-cylinder internal combustion engine. However, the number of port members 1 is not just limited to three and any number can be adopted.

Note that, the resin intake manifold of the present invention may have an arrangement including an intake pipe, leading to the throttle body, which is provided at the center or one end of a cylindrical chamber, and a plurality of pipes which are integrated with a side wall of the chamber, wherein the resin intake manifold comprises a plurality of port members coupled together, each port member configured to integrate one end of the pipe with a cylindrical pipe of the chamber and to provide a port which is curved along the cylindrical pipe, the port members being coupled to a cylinder head mounting board member which is connected to outlets of the respective ports of the port members, to a lid member which closes an end of the chamber, and to a throttle body mounting pipe member.

Second Embodiment

The following will describe another embodiment of the present invention with reference to FIG. 5 through FIG. 8.

Figure 5:
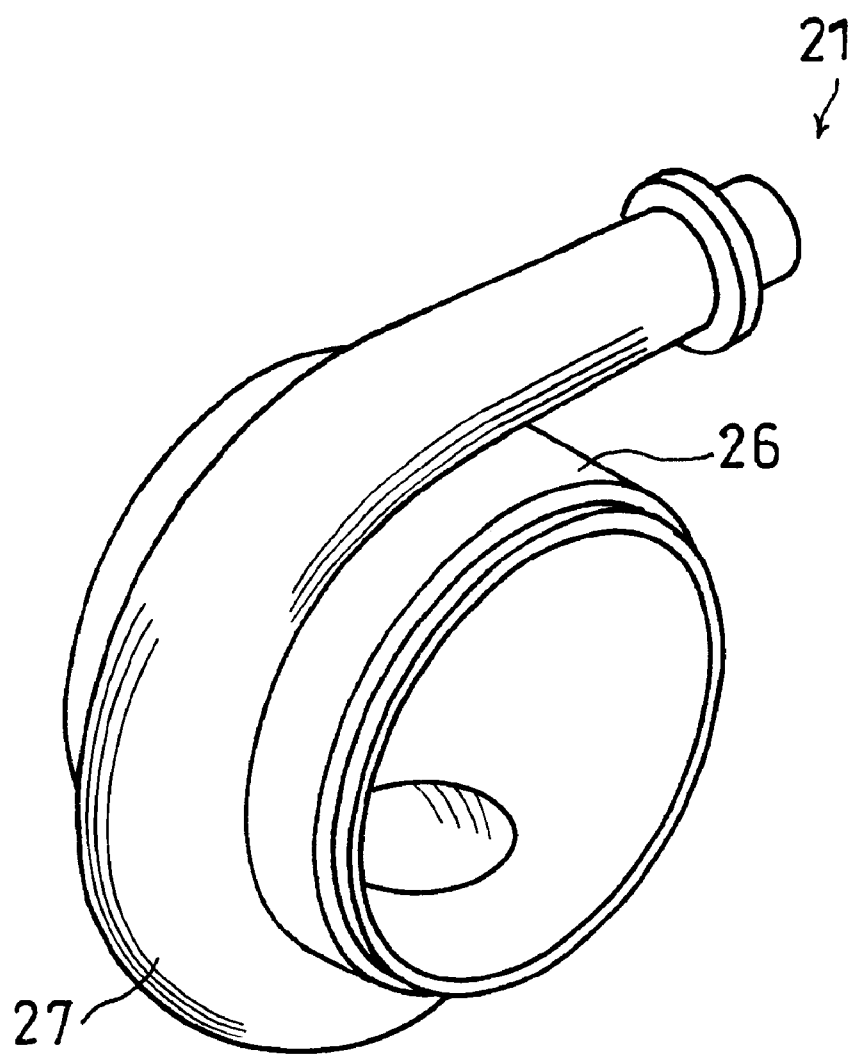
FIG. 5 is a perspective view showing a structure of a port member making up a resin intake manifold of the Second Embodiment.
Figure 6:
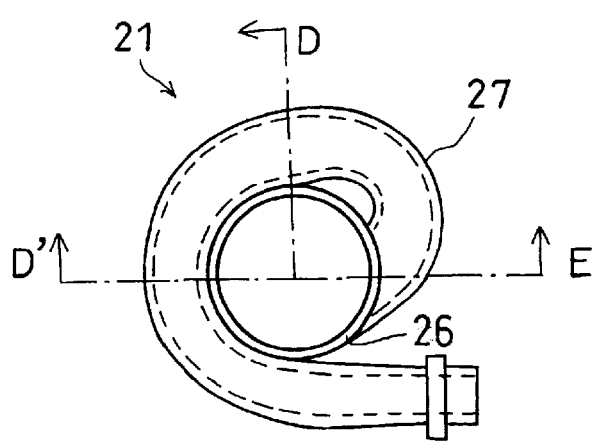
FIG. 6(*a*) through FIG. 6(*c*) show a structure of the port member making up the resin intake manifold of the Second Embodiment, in which FIG. 6(*a*) is a side view.
Figure 6:
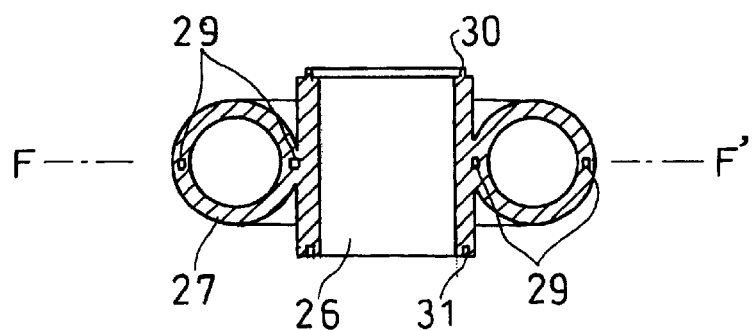
Figure 6:
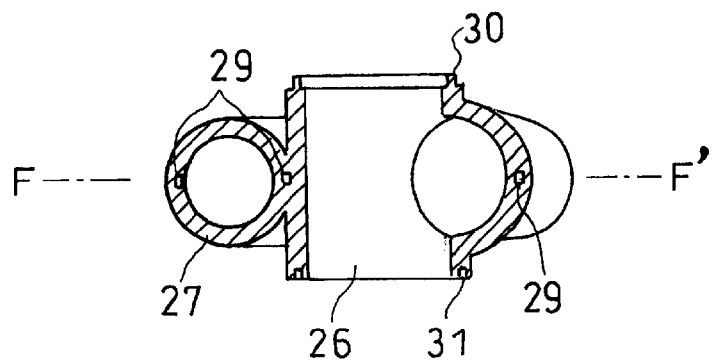

As shown in FIG. 5 and FIG. 6, a pipe section 27 of a port member 21 extends from a cylindrical section 26 (cylindrical body, chamber section) to coil along the external wall of the cylindrical section 26. Further, as shown in FIG. 6(a), the external wall of the pipe section 27 on the side of the external wall of the cylindrical section 26 is at least partially connected to the external wall of the cylindrical section 26.

Thus, the arrangement of a resin intake manifold manufactured with the port member 21 is such that the pipe section 27 extends from the chamber section so as to coil along the external wall of the chamber section, and the external wall of the pipe section 27 on the side of the external wall of the chamber section is at least partially connected to the external wall of the chamber section.

Because the external wall of the pipe section 27 is connected to the external wall of the chamber section, there will be no air space between the external wall of the cylindrical section 26 and that of the pipe section 27, thus making the resin intake manifold compact. In addition, rigidity (strength) of the chamber section can be improved. Thus, for example, even in case of an incidence such as a backfire which exerts a high pressure on the chamber section, the pressure can be dispersed over the pipe section 27 through the connected portion of the chamber section and the pipe section 27. As a result, the chamber section will not be damaged.

The port member 21 is formed by joining the divided half-parts along the line F-F' as indicated in FIG. 6(a) and FIG. 6(c). The method of joining the half-parts is not particularly limited, and the present embodiment adopt the method using molten resin. Thus, the mating faces of the half-parts are provided with grooves in the form of a ring which combine to form a molten resin groove 29 which is filled with the molten resin when the half-parts are joined. Note that, the mating faces of the port member 21 have a raised portion 30 and a recessed portion 31 as with the port member 1.

Figure 7:
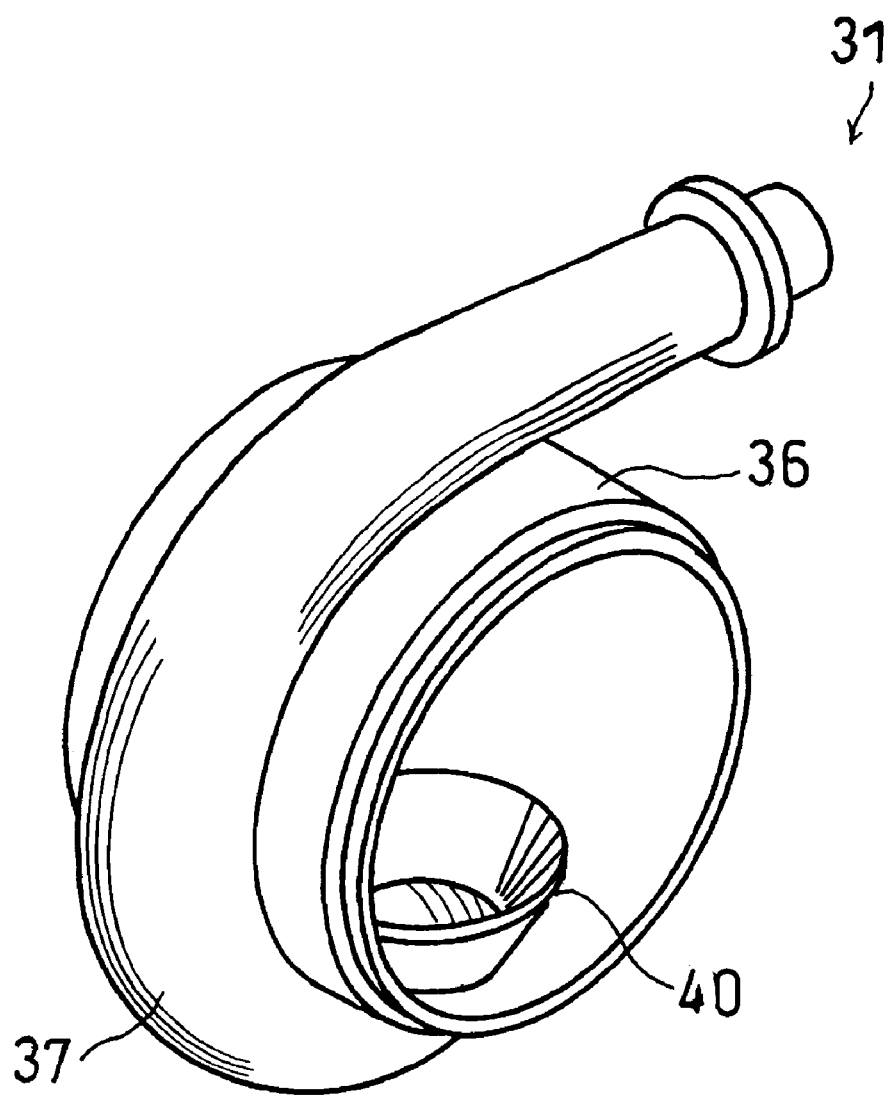
FIG. 7 is a perspective view showing a structure of a port member with an opening portion in the form of a funnel.
Figure 8:
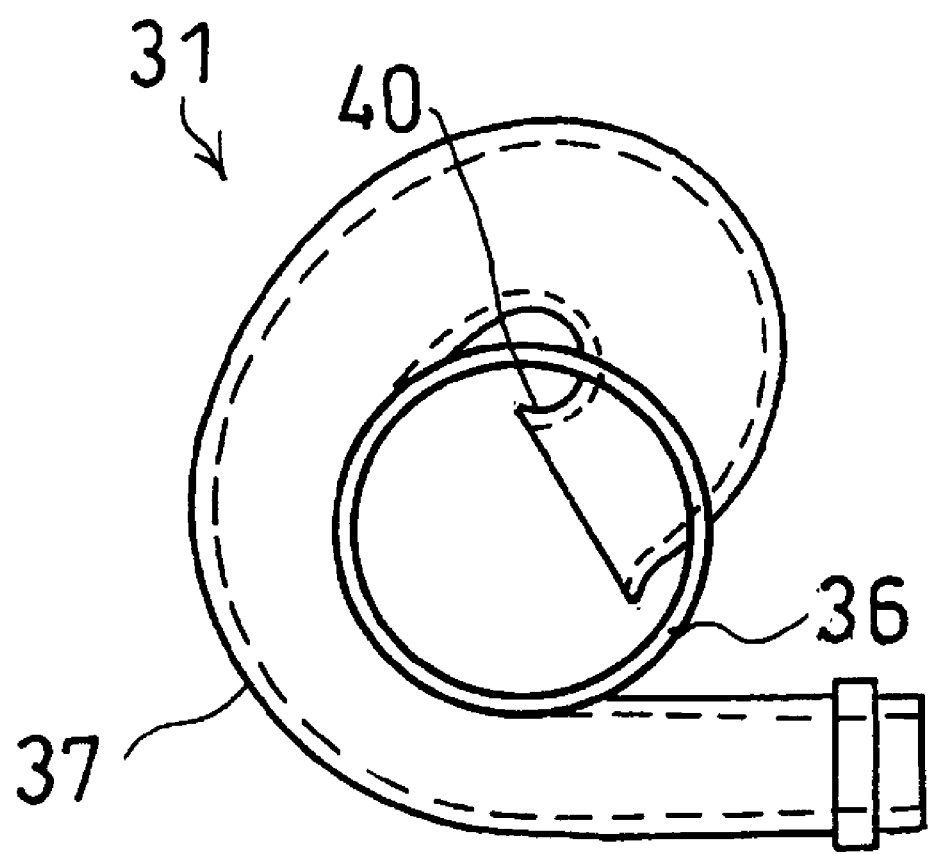
FIG. 8 is a side view showing the port member with the opening portion in the form of a funnel.

As shown in FIG. 7 and FIG. 8, a port member 31 of the resin intake manifold of the present invention has a pipe section 37 whose opening portion 40 on the side of a cylindrical section (cylindrical body, chamber section) 36 is in the form of a funnel. With this opening portion 40 in the form of a funnel, the suction efficiency of the pipe section 37 can be improved.

Here, the port member 31, as with the port member 21, is formed by joining the half-parts of the port member 31 which are divided on a plane parallel to the mating faces of the cylindrical section 36, and therefore the opening portion 40 can be integrally formed with the pipe section 37. This structure has an advantage over the structure in which the opening end of the pipe section 37 is additionally provided with a funnel, because the inner wall of the opening portion 40 in the form of a funnel has a smoother surface. With this structure, gas flows into the pipe section 37 more smoothly, which in turn improves suction efficiency of the pipe section 37 of the resin intake manifold.

Third Embodiment

Figure 9:
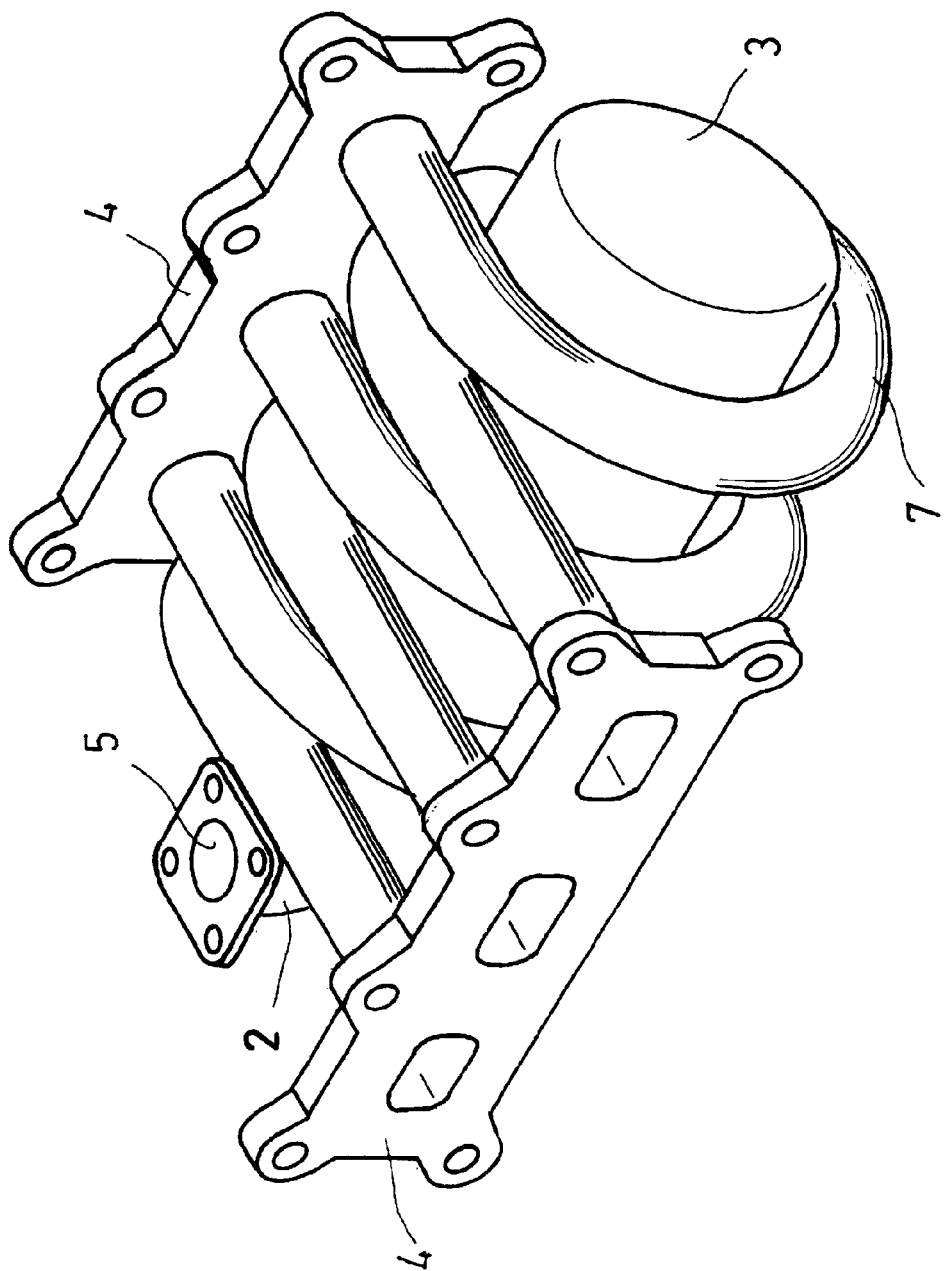
FIG. 9 is a perspective view showing a structure of a resin intake manifold used with a V-6 internal combustion engine according to the Third Embodiment.
Figure 10:
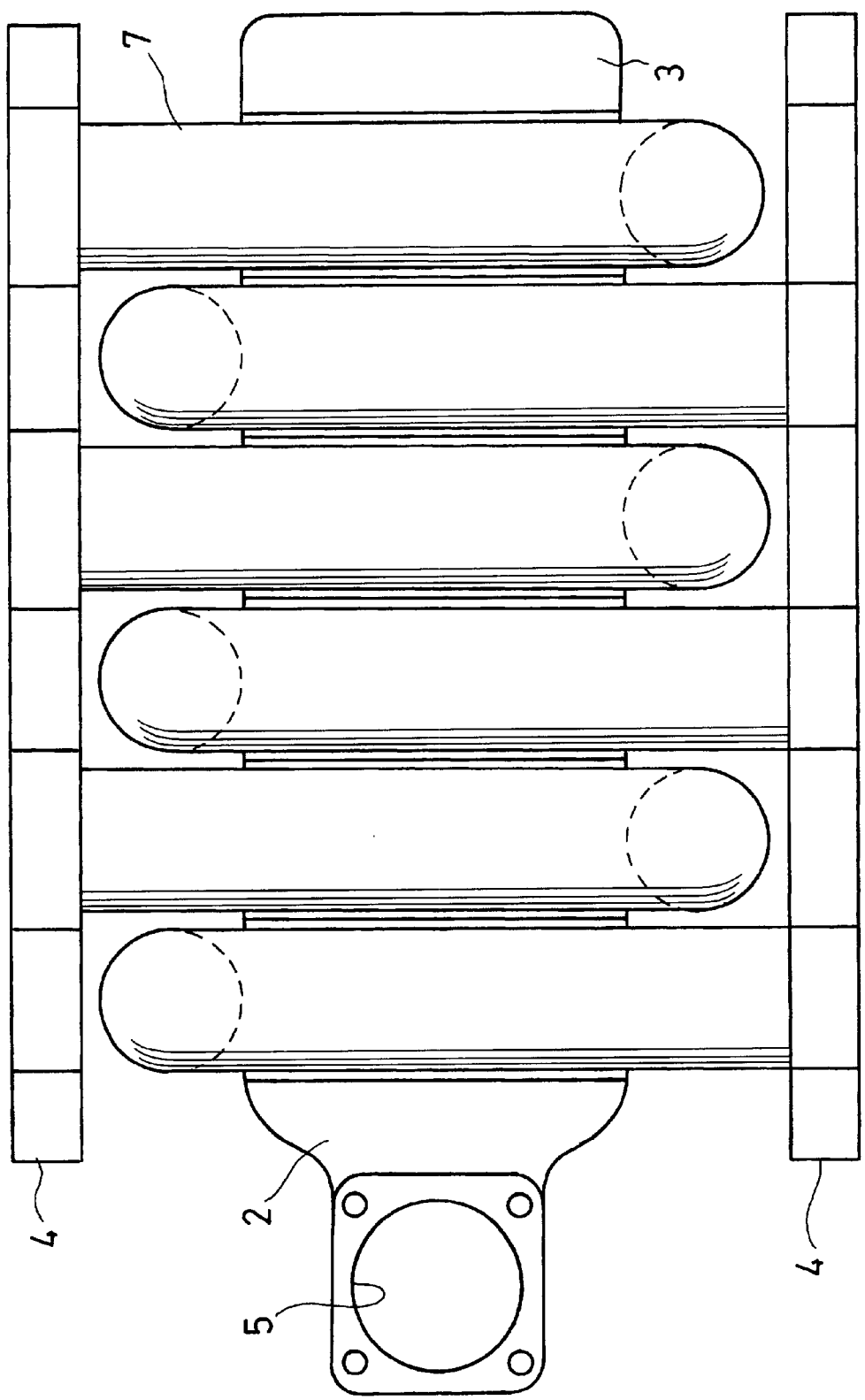
FIG. 10 is a plan view showing a structure of a resin intake manifold used with a V-6 internal combustion engine according to the Third Embodiment.

The following will describe yet another embodiment of the present invention with reference to FIG. 9 and FIG. 10. The following description of the present embodiment is based on the resin intake manifold of the present invention used with a V-6 internal combustion engine.

As shown in FIG. 9 and FIG. 10, a resin intake manifold of the present embodiment includes the port member 1 (see FIG. 3), throttle body mounting pipe member 2, lid member 3, and cylinder head mounting board member 4. The pipe sections 7 are arranged so that their opening ends to be connected to the cylinder head mounting board member 4 alternately direct in opposite directions.

The resin intake manifold can be manufactured for use in a V-internal combustion engine by thus joining the port members 1 so that their pipe sections 7 alternately direct in opposite directions. That is, the port members 1 used for manufacture of the in-line three-cylinder internal combustion engine (see FIG. 1, FIG. 2) can be used for the resin intake manifold of a V-internal combustion engine. In effect, by using the port members 1 as a common member, manufacturing cost of the resin intake manifold can be reduced.

The present embodiment described the resin intake manifold which comprises six port members 1 to adapt to a V-6 internal combustion engine. However, the number of port members 1 is not just limited to three and any number can be adopted.

Fourth Embodiment

Figure 11:
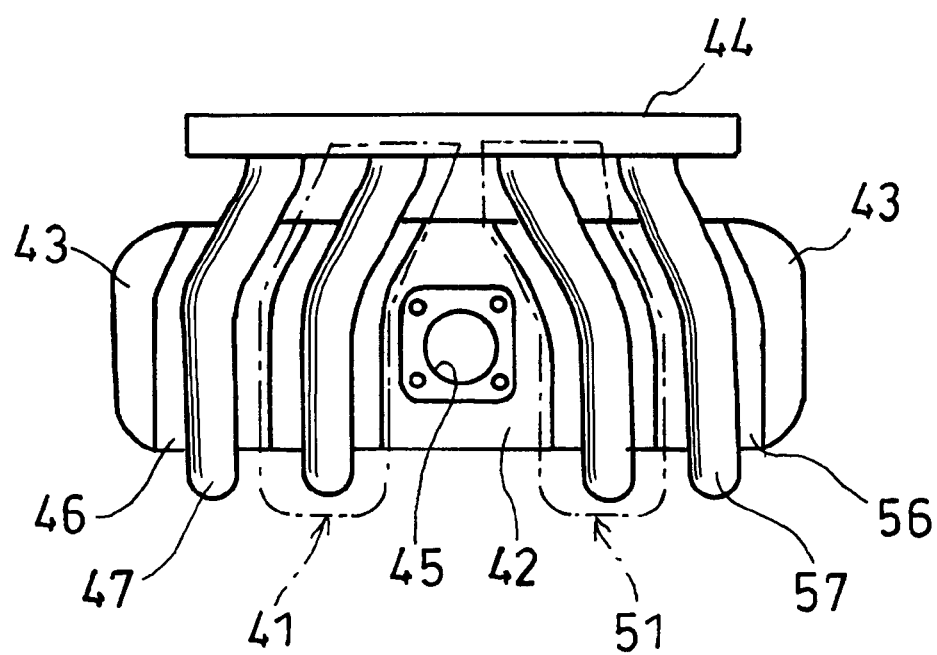
FIG. 11 is a plan view showing a structure of a resin intake manifold used with an in-line internal combustion engine according to the Fourth Embodiment.

The following will describe still another embodiment of the present invention with reference to FIG. 11. Note that, the following description of the present embodiment is based on the resin intake manifold of the present invention used with an in-line 4-cylinder internal combustion engine.

As shown in FIG. 11, the resin intake manifold of the present invention includes a port member 41, throttle body mounting pipe member (cylindrical body, chamber section, cylindrical member) 42, lid member (chamber section) 43, cylinder head mounting board member 44, and port member 51. The chamber section of the resin intake manifold includes, at the center in the lengthwise direction, an intake port 45 which leads to a throttle body (not shown).

The port member 41 is composed of a cylindrical section (cylindrical body, chamber section) 46, and a pipe section 47. The port member 51 is composed of a cylindrical section (cylindrical body, chamber section) 56, and a pipe section 57. The pipe section 47 is shaped to coil along the external wall of the cylindrical section 46, and the pipe section 57 is shaped to coil along the external wall of the cylindrical section 56.

The chamber section of the resin intake manifold is structured to include the throttle body mounting pipe member 42 with the intake port 45 between the port member 41 and the port member 51. That is, the chamber section makes up a cylindrical body joining the port member 41, the throttle body mounting pipe member 42, and the port member 51.

Thus, with this structure where the intake port 45 is provided at the center in the lengthwise direction of the chamber section, there will be a smaller difference of distances from the intake port to the respective pipe sections, compared with the structure where the intake port is provided at an end in the lengthwise direction of the chamber section. Thus, the suction efficiency of the pipes can be made more uniform. Further, because the pipe section 47 and the pipe section 57 are bent in their way toward the intake port 45, the resin intake manifold can be made compact.

Fifth Embodiment

Figure 12:
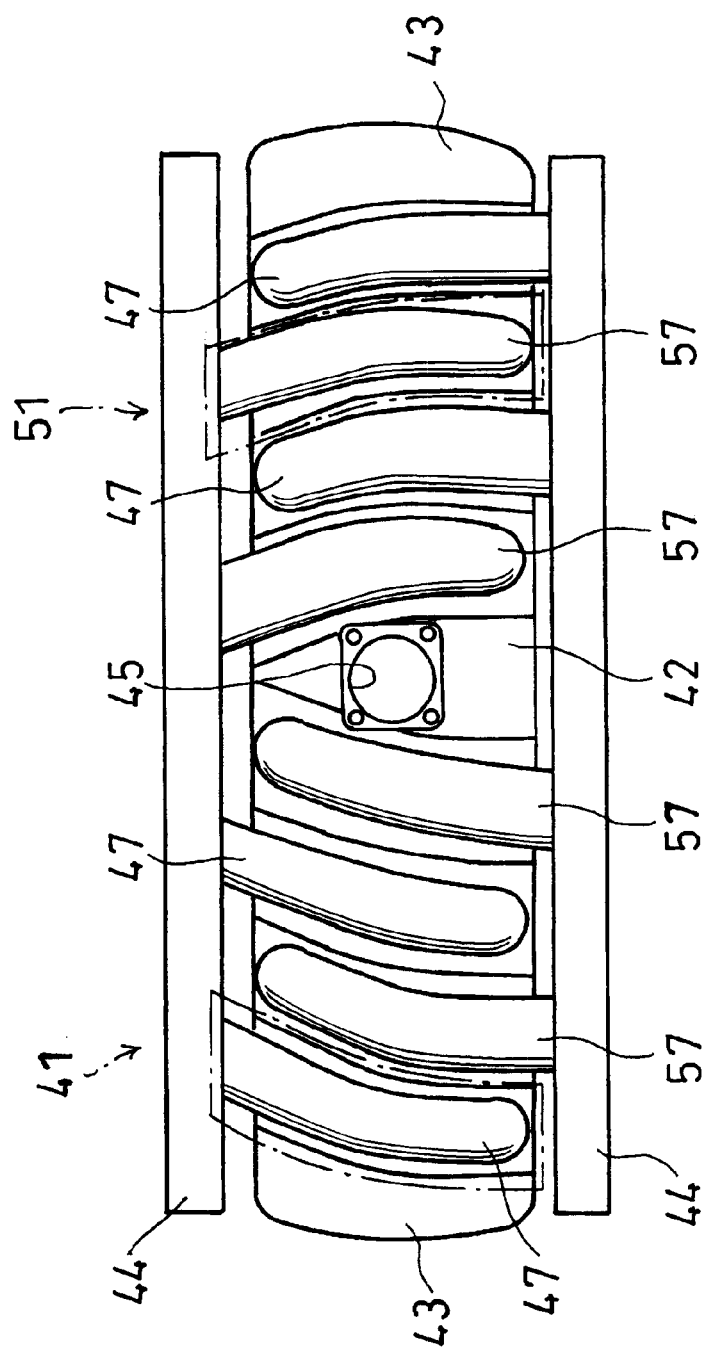
FIG. 12 is a plan view showing a structure of a resin intake manifold used with a V-8 internal combustion engine according to the Fifth Embodiment.

The following will describe yet another embodiment of the present invention with reference to FIG. 12. Note that, the following description of the present embodiment is based on the resin intake manifold of the present invention used with a V-8 internal combustion engine.

As shown in FIG. 12, the resin intake manifold of the present invention includes a port member 41, port member 51, throttle body mounting pipe member 42, lid member 43, and cylinder head mounting board member 44. The chamber section of the resin intake manifold is provided with, at the center in the lengthwise direction, an intake port 45 which leads to a throttle body (not shown). The port member 41 and the port member 51 are arranged so that the opening ends of the pipe section 47 and the pipe section 57 to be joined with the cylinder head mounting board member 44 direct alternately in the opposite directions.

By thus disposing the pipe sections in different directions, the port members 41 and 51 of the in-line 4-cylinder internal combustion engine can be commonly used to manufacture the resin intake manifold for a V-8 internal combustion engine.

The intake port 45 of the resin intake manifold of the present invention is provided at the center in the lengthwise direction of the chamber section. Thus, compared with the structure where the intake port is provided at an end in the lengthwise direction of the chamber section, the suction efficiency of the pipes can be made more uniform. Further, because the pipe section 47 and the pipe section 57 are bent in their way toward the intake port, the resin intake manifold can be made compact.

It is preferable in a manufacturing process of the resin intake manifold according to the present invention that, as described above, at least two of the port members are adapted to have the same configuration.

With this arrangement, at least two port members having the same configuration can be manufactured in the same step. Thus, the number of manufacturing steps can be reduced to efficiently manufacture the port members. For example, when at least two port members having the same configuration are to be formed using a mold, the same mold can be used for these port members. This, in effect, reduces the number of required molds. Therefore, with the foregoing arrangement, intake manifolds can be manufactured at low cost even when the number of products manufactured is small.

As described, the resin intake manifold according to the present invention includes an intake vessel which is provided with an intake port leading to a throttle body, and a cylinder conduit conducting to cylinders of a multi-cylinder internal combustion engine, wherein the intake vessel comprises a plurality of port members each having the cylinder conduit.

In this arrangement, the intake manifold comprises a pipe which branches into a plurality of branch pipes which extend from the chamber section serving as a base of the branches. One of the branch pipes becomes the intake port, while the others become pipes which conduct to cylinders of the multi-cylinder internal combustion engine.

Here, the intake vessel refers to the chamber section, or the combination of the chamber section and the pipe section of the foregoing embodiments.

Further, the port members correspond to, for example, the port members 1a, 1b, 1c as shown in FIG. 1. In the example of port members 1a, 1b, 1c, the cylinder conduit corresponds to the pipe section 7 as shown in FIG. 1. That is, in the foregoing example, the intake vessel correspond to the combination of the chamber section and the pipe section. Further, the intake port corresponds to the throttle body mounting pipe member 2.

In the foregoing arrangement, the intake vessel of the resin intake manifold according to the present invention is made up of a plurality of port members. That is, according to this arrangement, the intake vessel does not comprise the intake vessel by itself, but comprises the intake vessel by the combination of the port members.

Therefore, with this arrangement, the intake vessel can have different numbers of branch pipes by changing the number of port members used. Thus, the resin intake manifold according to the present invention can be manufactured to easily adapt to engines with various numbers of cylinders by changing the number of port members used. Therefore, the resin intake manifold according to the present invention can be manufactured at low cost, even when the number of products manufactured is small, by using the foregoing port members.

Further, in the foregoing example, the port members 1a, 1b, 1c as shown in FIG. 1 have the same configuration. However, the present invention is not just limited to this, and, for example, two or more port members may have different configurations. Even so, the same configuration as in the port members 1a, 1b, 1c as shown in FIG. 1 for example is preferable, because it allows the port members to be manufactured in a single step, which reduces manufacturing cost.

Further, in the foregoing example, the port members 1a, 1b, 1c each have the pipe section 7 which corresponds to the cylinder conduit. However, the present invention is not just limited to this, and two or more cylinder conduits may be provided for each port member. Even so, the port member is preferably provided with only single pipe section 7 which corresponds to the cylinder conduit, as in the port members 1a, 1b, 1c as shown in FIG. 1, because this allows the port member to be used in engines with any number of cylinders. Further, the port member with a single cylinder conduit can be made more compact than the port member with two or more cylinder conduits. This allows the use of, for example, a smaller mold when it is used to form the port members, thereby reducing cost of the mold.

Further, for example, in the port members 1a, 1b, 1c as shown in FIG. 1, the intake vessel is made up of the chamber section and the pipe section as described above, and the wall of the chamber section of the port member has a cylindrical wall. However, the present invention is not just limited to this arrangement. That is, the wall of the chamber section of the port member should at least make up a portion of the chamber section. For example, the port member of the present invention may be adapted so that a portion of the wall of the cylindrical chamber section such as the cylindrical section 6 as shown in FIG. 1 is divided into two parts on a place including the axis of the cylinder, and a member analogous to the cylinder conduit is attached on the external wall of the divided part, and finally a portion of the wall where this member was attached is opened. In short, the wall of the chamber section of the port member does not necessarily need to have the cylindrical wall. However, the port member with the chamber section partially having a cylindrical wall is preferable because it requires less coupling sites compared with the port member which does not have the cylindrical wall. Thus, in addition to reducing manufacturing cost, the strength of the intake manifold can be improved.

Further, for example, in the port members 1a, 1b, 1c as shown in FIG. 1, the pipe section 7 which corresponds to the cylinder conduit is included in the port member in its entirety. However, the present invention is not just limited to this arrangement. For example, the port member of the resin intake manifold according to the present invention may have an arrangement which is essentially the same as that of the port members 1a, 1b, 1c as shown in FIG. 1, but does not include the pipe section 7. In this case, the intake vessel corresponds to only the chamber section, rather than the combination of the chamber section and the pipe section. In such an arrangement, the pipe section 7 is additionally provided to be joined to the port member of this arrangement. Despite these, the arrangement where the port member entirely includes the pipe section 7 which corresponds to the cylinder conduit, for example, as in the port members 1a, 1b, 1c as shown in FIG. 1 is preferable because it requires less coupling sites and less cost.

As described, the resin intake manifold according to the present invention having the foregoing arrangement may be adapted so that at least two of the port members have the same configuration.

According to this arrangement, as in the foregoing manufacturing process, at least two port members having the same configuration can be manufactured in the same step. Thus, the number of manufacturing steps can be reduced to efficiently manufacture the port members. For example, when at least two port members having the same configuration are to be formed using a mold, the same mold can be used for these port members. This, in effect, reduces the number of required molds.

The resin intake manifold according to the present invention having the foregoing arrangement may be adapted so that portions of the port members where they are coupled to each other have a fitting structure at least partially.

An example of such a fitting structure is the raised portion 10 and the recessed portion 11 of the port member 1 as shown in FIG. 4(b) and FIG. 4(c).

In the foregoing arrangement, by the fitting structure, the coupling strength of the port members can be improved.

The resin intake manifold according to the present invention having the foregoing arrangement may be adapted so that the cylindrical conduit is in the form of a pipe which extends outward from the intake vessel.

According to this arrangement, an example of the cylinder conduit in the form of a pipe is the pipe section 7 as shown in FIG. 1. With this arrangement, since the port member is formed including the pipe section, it is not required to additionally join the pipe section with the port member, which would be required when the port member is formed without the pipe section.

The resin intake manifold according to the present invention having the foregoing arrangement may be adapted so that the cylinder conduit of the port members adjacent to each other extends alternately in opposite directions.

This arrangement enables manufacture of intake manifolds for V-engines. That is, the resin intake manifold according to the present invention, with the foregoing port members, can be used to manufacture intake manifolds for V-engines. That is, the port members can be shared to reduce manufacturing cost.

The resin intake manifold according to the present invention having the foregoing arrangement may be adapted so that the external wall of the cylinder conduit is connected to the external wall of the intake vessel.

An example of an intake manifold having such an arrangement is the intake manifold with the arrangement as shown in FIG. 6(a).

According to this arrangement, since the cylinder conduit is connected to the external wall of the intake vessel, the intake manifold can be made compact. Further, since the cylinder conduit is connected to the intake vessel, the strength of the intake manifold can be improved.

The resin intake manifold according to the present invention having the foregoing arrangement may be adapted so that an inner wall of the intake vessel where the cylinder conduit extends into the intake vessel is in the form of a funnel.

An example of an intake manifold having such an arrangement is the intake manifold as shown in FIG. 7 and FIG. 8. In the example of FIG. 7 and FIG. 8, the cylinder conduit corresponds to the pipe section 37. Further, in the example of FIG. 7 and FIG. 8, the intake vessel corresponds to the cylindrical section 36 and the pipe section 37. Further, in the example of FIG. 7 and FIG. 8, the portion where the cylinder conduit extends into the intake vessel corresponds to the opening portion 40. Further, in this example, the opening portion 40 is in the form of a funnel.

With the arrangement wherein an inner wall of the intake vessel where the cylinder conduit extends into the intake vessel is in the form of a funnel, suction efficiency of the intake manifold can be improved.

The resin intake manifold according to the present invention having the foregoing arrangement may be adapted so that the cylinder conduit is curved along an external wall of the intake vessel, and is bent toward the intake port with respect to an end of the cylinder conduit conducting to the cylinders of the multi-cylinder internal combustion engine.

An example of an intake manifold having such a arrangement is the intake manifold as shown in FIG. 12. In the example of FIG. 12, the cylinder conduit independently corresponds to the pipe section 47 and the pipe section 57. Further, in the example of FIG. 12, the intake port independently corresponds to the throttle body mounting pipe member 42 and the intake port 45.

According to the foregoing arrangement, the pipe section 47 and pipe section 57 corresponding to the cylinder conduit are curved along the external wall of the intake vessel. Further, the pipe section 47 and pipe section 57 corresponding to the cylinder conduit are bent toward the intake port 45 of the throttle body mounting pipe member 42 which corresponds to the intake port, with respect to an end of the pipe section 47 and pipe section 57 conducting to the cylinders of the multi-cylinder internal combustion engine.

This arrangement is advantageous because it can make the intake manifold compact while ensuring sufficient length for the cylinder conduit.

Note that, the foregoing embodiments described the case where the port members were used and combined as the basic unit to form the intake vessel or the intake manifold. However, the present invention is not just limited to this arrangement. That is, for example, as described with reference to FIG. 4(b) and FIG. 4(c), the half-parts of the port members may be used as the basic unit. In other words, in the example of FIG. 4(b) and FIG. 4(c), for example, the raised portion 10 and the recessed portion 11 of the half-parts may be mated to form whole parts, which are later combined to form the intake vessel. That is, the resin intake manifold according to the present invention includes all those intake manifolds which have at least two of the foregoing basic units analogous to the port member of the present invention, regardless of the configuration of the smallest basic units which are combined, or the procedure of combining these basic units.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A resin intake manifold having a chamber section with an intake port which leads to a throttle body, and a plurality of pipe sections which connect interior of the chamber section to respective cylinders of a multi-cylinder internal combustion engine, wherein, said chamber section comprises a cylinder body which is made up of a plurality of port members coupled together, each of the plurality of port members having a pipe section, and a cylindrical section whose external wall is connected to one end of the pipe section;

each port member being constructed to be coupled to another port member in different positions wherein the pipe section thereof extends in different directions to enable the port members to be connected to the cylinders of different types of internal combustion engines.

2. The resin intake manifold as set forth in claim 1, wherein:

the pipe section extends from the chamber section so as to coil along an external wall of the chamber section, and an external wall of the pipe section on the side of the external wall of the chamber section is at least partially connected to the external wall of the chamber section.

3. The resin intake manifold as set forth in claim 1, wherein an opening portion of the pipe section which opens into the chamber section is in the form of a funnel.

4. The resin intake manifold as set forth in claim 1, wherein:

the chamber section comprises a cylindrical body which is made up of the plurality of port members coupled to a cylindrical member which is provided with an intake port and inserted between any of the port members, and the pipe section is curved to coil along an external wall of the chamber section, and is bent toward the intake port.

5. A resin intake manifold having an intake vessel which is provided with an intake port leading to a throttle body, and a cylinder conduit conducting to cylinders of a multi-cylinder internal combustion engine, wherein the intake vessel comprises a plurality of port members each having the cylinder conduit;

each port member being constructed to be coupled to another port member in different positions wherein the cylinder conduit thereof extends in different directions to enable the port members to be connected to the cylinders of different types of combustion engines.

6. The resin intake manifold as set forth in claim 5, wherein at least two of the port members have the same configuration.

7. The resin intake manifold as set forth in claim 5, wherein the port members have portions with a fitting structure in the areas where they are coupled to each other.

8. The resin intake manifold as set forth in claim 5, wherein the cylinder conduit is in the form of a pipe which extends outward from the intake vessel.

9. The resin intake manifold as set forth in claim 8, wherein the cylinder conduit of the port members adjacent to each other extends alternately in opposite directions.

10. The resin intake manifold as set forth in claim 8, wherein an external wall of the cylinder conduit is connected to an external wall of the intake vessel.

11. The resin intake manifold as set forth in claim 8, wherein an inner wall of the intake vessel where the cylinder conduit extends into the intake vessel is in the form of a funnel.

12. The resin intake manifold as set forth in claim 8, wherein the cylinder conduit is curved along an external wall of the intake vessel, and is bent toward the intake port with respect to an end of the cylinder conduit conducting to the cylinders of the multi-cylinder internal combustion engine.

13. The resin intake manifold as set forth in claim 7, wherein the fitting structure is in the form of a ring on mating faces of said port members.

* * * * *